No. 11,803 Reissued Jan. 23, 1900.

P. R. CONDON.

PEGGING MACHINE.

(Application filed Dec. 14, 1897.)

2 Sheets—Sheet 1.

Witnesses.
W. J. Baldwin
E. M. Healy

Inventor.
P. R. Condon
By
Southgate & Southgate
Attorneys.

No. 11,803. Reissued Jan. 23, 1900.

P. R. CONDON.

PEGGING MACHINE.

(Application filed Dec. 14, 1897.)

2 Sheets—Sheet 2.

Witnesses.

W. J. Baldwin

E. M. Healy.

Inventor.

P. R. Condon

By

Southgate & Southgate

Attorneys

UNITED STATES PATENT OFFICE.

PATRICK R. CONDON, OF SPENCER, MASSACHUSETTS, ASSIGNOR TO CHARLES N. PROUTY, OF SAME PLACE.

PEGGING-MACHINE.

SPECIFICATION forming part of Reissued Letters Patent No. 11,803, dated January 23, 1900.

Original No. 580,379, dated April 13, 1897. Application for reissue filed December 14, 1897. Serial No. 661,903.

*To all whom it may concern:*

Be it known that I, PATRICK R. CONDON, a citizen of the United States, residing at Spencer, in the county of Worcester and State of Massachusetts, have invented a new and useful Improvement in Pegging-Machines, of which the following is a specification.

My invention relates to that class of pegging-machines which are ordinarily employed for automatically driving wooden pegs.

The object of my invention is to provide an improved construction for supporting and operating the horn of the pegging-machine, and to provide means for automatically trimming or cutting off the ends of the pegs.

To these ends my invention consists of the parts and combination of parts, as hereinafter described, and more particularly pointed out in the claims at the end of this specification.

Figure 1:
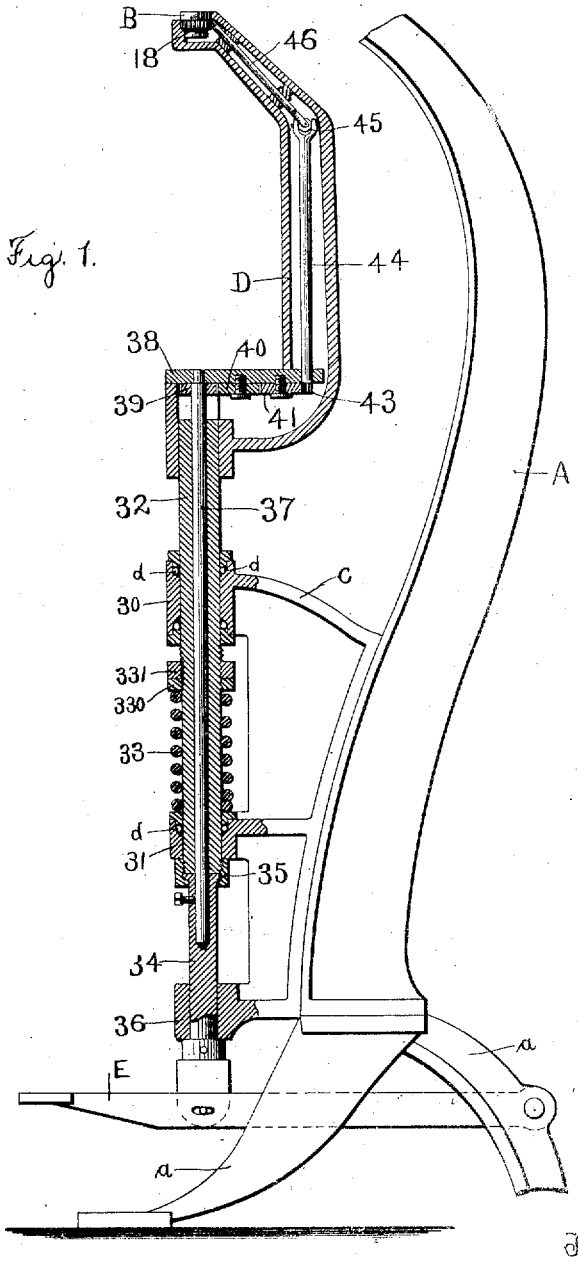
Figure 2:
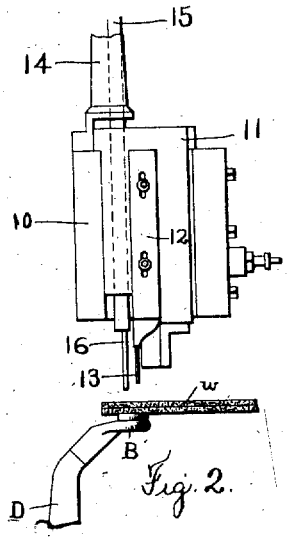
Figure 3:
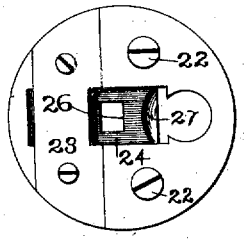
Figure 4:
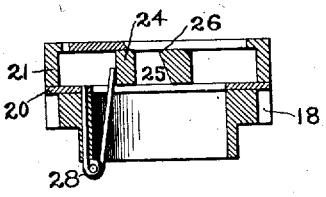

In the accompanying two sheets of drawings, Figure 1 is a side view, partially in section, of a sufficient part of a pegging-machine to illustrate the application of my invention. Fig. 2 is a partial front view illustrating one form of peg-driving mechanism which I may employ. Figs. 3 and 4 are detail views of the button or anvil and illustrate the construction which I employ for automatically trimming or cutting off the ends of the pegs; and Figs. 5 to 7, inclusive, are detail views illustrating the operation of the device.

Referring to the drawings and in detail, A designates the frame of the machine, which rests upon and is supported by suitable legs, as *a*. Extending from the front of the frame A is a piece or bracket C, having bearings 30 and 31. A vertical spindle 32 is journaled in the bearings 30 and 31 by means of suitable bearing-balls, as *d*. Secured upon the upper end of the spindle 32 is a hollow horn or arm D, having a button or anvil B journaled therein in the ordinary manner. Surrounding the horn-spindle 32 is a coiled lifting-spring 33. The tension of the lifting-spring 33 can be adjusted in any desired manner.

As illustrated, I preferably provide an adjusting-nut 330, threaded onto the horn-spindle 32, and held in its adjusted position by means of a check-nut 331. At its lower end the horn-spindle 32 is loosely connected by a threaded piece 35 with a treadle-rod 34. The treadle-rod 34 is mounted in a suitable bearing 36 and is connected to a suitable treadle, as E.

Mounted inside of the horn-spindle 32, which is preferably bored out or made hollow, I provide a stationary spindle 37, which, near its upper end, passes loosely through a plate 38, carried by the horn D, and is rigidly connected at its lower end to the treadle-rod 34.

The spindle 37 is connected at its upper end with a train of gearing for holding the button or anvil B in a fixed position with respect to the frame of the machine. As illustrated, this train of gearing comprises a gear 39, fastened on the spindle 37, which meshes with a train of gears 40, 41, and 43. The gear 43 forms part of the vertical rod 44, which is connected at its upper end by a universal joint 45 with an inclined rod 46, which is provided at its end with a suitable bevel-pinion or gear-teeth which mesh with and engage the gear-teeth 18 upon the button or anvil B.

By mounting the horn-spindle 32 upon ball-bearings in the frame I have found in practice that the efficiency of the machine is considerably increased, as the horn D can be more readily turned or shifted to properly guide the work into the desired position with respect to the peg-driving mechanism.

By mounting the coiled lifting-spring 33 so that it surrounds the horn-spindle 32 the tension of said lifting-spring will be exerted in line with the axis of the spindle, and there will be no tendency of the spindle to cramp or bind in its bearings.

The peg-driving mechanism which I employ may be of any of the ordinary or approved constructions, and I have shown only such parts of the coöperating mechanism as will be necessary to an understanding of my peg-cutting devices.

Referring to Fig. 2, 10 designates a head or piece which is mounted so that it may swing or move transversely. Loosely mounted in the head 10 is a vertically-movable slide 11, having a piece 12 adjustably secured thereto, which carries the awl 13 at its lower end. Loosely mounted in the slide 11 and extending through a guiding-bracket 14 is a reciprocating part or slide 15, having a driver 16 at its lower end for forcing the wooden pegs into the holes punched by the awl 13.

The mechanism for splitting off and feeding the pegs into position to be acted upon by the driver 16 and the gearing for imparting the proper motion to the parts of the peg-driving mechanism may be of any of the ordinary or approved constructions, which need not be herein shown or described at length.

In that class of pegging-machines to which my invention relates the ends of the pegs have heretofore ordinarily been allowed to project through the work *w* and have had to be cut out by hand or by the use of additional machinery. To overcome this defect, I provide means for automatically trimming or cutting off the projecting ends of the pegs.

As illustrated, the button or anvil B comprises a lower or gear section 18 and a top section or cover 21. A washer, as 20, is interposed between these sections, and the parts are secured together, as by means of small screws, as 22.

Mounted in suitable ways in the cover or plate 21 and resting upon the washer 20 I provide a spring-pressed piece or guide 24, which is formed with a socket or opening 25 for receiving the ends of the pegs and with a beveled or cutting edge 26 at the rear of said socket.

The upper rear edge of the piece 24 is slightly rounded or beveled, as at 27, to coöperate with the awl 13.

A plate or knife 23 is secured in the plate 21 in position to coöperate with the piece 24, so that the cutting edge 26 and the knife 23 may coöperate substantially as shears.

A torsional spring 28 is arranged to hold the piece 24 in its normal position, one leg of the torsional spring being secured in the base-section of the button B and the other leg of said spring engaging the front of the piece 24.

In practice I have found that a torsional spring as thus arranged will control the movement of the piece 24 in the most efficient manner; but, if desired, a small spiral spring may be located to engage directly against the front edge of the piece 24, or these parts may be differently arranged and connected.

Figure 5:
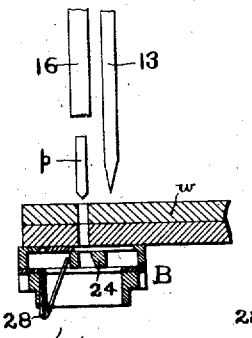
Figure 6:
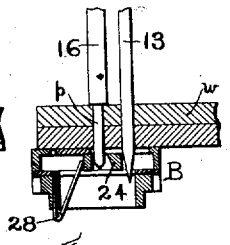
Figure 7:
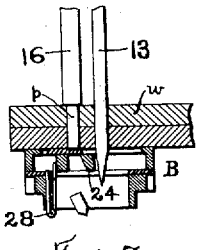

The operation of the peg-trimming mechanism is most clearly illustrated in Figs. 5 to 7. In Fig. 5 the parts are shown in their normal position, the awl 13 being raised clear of the work *w* and the driver 16 being in position to engage with a wooden peg, as *p*. The slide 11 will then move down, bringing the awl 13 in engagement with the work, and at or about the same time the driver 16 will be actuated to drive home the peg *p*, as illustrated in Fig. 6, the end of the peg extending into the socket 25 in the piece 24. The entire head or slide 10 will then be shifted laterally to respace the work *w*, bringing the parts into the position illustrated in Fig. 7 and moving the peg into engagement with the blade or knife 23, so that the end of the peg will be sheared or cut off between the knife 23 and the beveled edge 26. The driver 16 and the awl 13 will then be raised, and the head 10 will be shifted to bring the parts back to the position illustrated in Fig. 5, the piece 24 being restored to its normal position by means of its spring 28. The piece 24 as thus arranged and mounted in the button B will prevent the pegs from crippling, twisting, or becoming loosened in the work when they are brought into engagement with the stationary knife or blade 23, and the shearing action of the blade 23 and the cutting edge 26 will insure an even trimming or cutting of the pegs.

I am aware that changes may be made in the construction of pegging-machines by those who are skilled in the art without departing from the scope of my invention as expressed in the claims and that certain features of my invention may be used in different constructions and in different combinations.

I do not wish, therefore, to be limited to the forms which I have shown and described; but What I do claim, and desire to secure by Letters Patent of the United States, is—

1. In a pegging-machine, the combination of a vertical spindle journaled in the frame of the machine by means of suitable ball-bearings, a horn carried by said spindle, a lifting-spring coiled around said spindle, a button or anvil journaled in said horn, a treadle-rod loosely connected to the lower end of said spindle, a rod rigidly connected to said treadle-rod, and a train of gearing for holding the button stationary independently of the rotation of the horn, substantially as described.

2. In a pegging-machine, the combination of a vertical spindle journaled in the frame of the machine, a horn carried by said spindle, a button or anvil journaled in said horn, a treadle-rod loosely connected to the lower end of said spindle, a rod or spindle rigidly connected to said treadle-rod, and a train of gearing for holding the button stationary independently of the rotation of the horn, substantially as described.

3. In a pegging-machine, the combination of a reciprocating awl arranged to move transversely to advance the work, a peg-driving mechanism, a button or anvil, said button or anvil being provided with a movable piece, and a stationary knife or blade for trimming off the ends of the pegs, substantially as described.

4. In a pegging-machine, the combination of a peg-driving mechanism and a button or anvil having a stationary blade or knife 23, a movable piece 24 for receiving the projecting ends of the pegs, said piece 24 being provided with a spring 28 for holding the same in its normal position, substantially as described.

In testimony whereof I have hereunto set my hand in the presence of two subscribing witnesses.

PATRICK R. CONDON.

Witnesses:
LOUIS W. SOUTHGATE,
PHILIP W. SOUTHGATE.